United States Patent
Derosier et al.

(10) Patent No.: US 11,493,245 B2
(45) Date of Patent: Nov. 8, 2022

(54) DIRECT EXPANSION EVAPORATOR WITH VAPOR EJECTOR CAPACITY BOOST

(71) Applicant: Evapco, Inc., Taneytown, MD (US)

(72) Inventors: Greg Derosier, Eldersburg, MD (US); Shri Gopalan, Westminster, MD (US)

(73) Assignee: Evapco, Inc., Taneytown, MD (US)

( * ) Notice: Subject to any disclaimer, the term of this patent is extended or adjusted under 35 U.S.C. 154(b) by 134 days.

(21) Appl. No.: 16/676,364

(22) Filed: Nov. 6, 2019

(65) Prior Publication Data

US 2020/0141620 A1 May 7, 2020

Related U.S. Application Data

(60) Provisional application No. 62/756,328, filed on Nov. 6, 2018.

(51) Int. Cl.
*F25B 41/00* (2021.01)
*F25B 41/42* (2021.01)
(Continued)

(52) U.S. Cl.
CPC .............. *F25B 41/00* (2013.01); *F25B 13/00* (2013.01); *F25B 41/34* (2021.01); *F25B 41/42* (2021.01); *F25B 2341/001* (2013.01)

(58) Field of Classification Search
CPC .................. F25B 41/00; F25B 2341/00; F25B 2341/001; F25B 2341/0011;
(Continued)

(56) References Cited

U.S. PATENT DOCUMENTS 3,214,932 A * 11/1965 Grant ...................... F25B 41/00
62/157
4,187,695 A * 2/1980 Schumacher ........... F25B 41/00
62/116
(Continued)

FOREIGN PATENT DOCUMENTS

CN 104501481 4/2015
CN 104501481 A * 4/2015 .............. F25B 41/00
(Continued)

OTHER PUBLICATIONS

International Search Report issued in co-pending application No. PCT/US2019/060153 dated Feb. 12, 2020.

*Primary Examiner* — Miguel A Diaz
(74) *Attorney, Agent, or Firm* — Whiteford, Taylor & Preston, LLP; Gregory M. Stone

(57) ABSTRACT

A system and method for increasing the refrigeration capacity of a direct expansion refrigeration system having a vapor separator and a vapor ejector. After the throttling process at the expansion device, the mixture of liquid and vapor enters the inlet separator. The vapor separator generates vapor to power the ejector through flashing of warm refrigerant liquid from a higher temperature and pressure to a lower pressure. The cooler refrigerant liquid then goes to the evaporator coil inlet. Furthermore, the system stabilizes the superheat of the outlet vapor and reduces fluctuations in outlet superheat caused by excess unevaporated liquid flowing from the outlets of the tubes due to mal-distribution at the inlet.

7 Claims, 5 Drawing Sheets

(51) Int. Cl.
*F25B 13/00* (2006.01)
*F25B 41/34* (2021.01)

(58) Field of Classification Search
CPC ...... F25B 2341/0013; F25B 2400/0407; F25B 9/08; F25B 9/10; F25B 41/31; F25B 13/00

See application file for complete search history.

(56) References Cited

U.S. PATENT DOCUMENTS

| | | | |
|---|---|---|---|
| 6,477,857 B2* | 11/2002 | Takeuchi | F25B 9/008 |
| | | | 62/191 |
| 10,323,863 B2* | 6/2019 | Siegert | F25B 9/08 |
| 10,782,055 B2* | 9/2020 | Zha | F25B 47/02 |
| 2016/0363351 A1* | 12/2016 | Kawano | F25B 45/00 |
| 2018/0119997 A1* | 5/2018 | Siegert | F25B 9/08 |
| 2020/0191457 A1* | 6/2020 | Zha | F25B 47/02 |

FOREIGN PATENT DOCUMENTS

| | | | |
|---|---|---|---|
| CN | 105627608 | | 6/2016 |
| JP | 2003269399 A | * | 9/2003 |
| JP | 2013-213605 | | 10/2013 |
| JP | 2015-4460 | | 1/2015 |
| JP | 2015004460 A | * | 1/2015 |

\* cited by examiner

200
DIRECT EXPANSION EVAPORATOR WITH VAPOR EJECTOR CAPACITY BOOST

BACKGROUND OF THE INVENTION

Field of the Invention

This invention relates to direct expansion refrigeration systems.

SUMMARY OF THE INVENTION

One of the drawbacks of direct expansion (DX) refrigeration technology when compared to pump overfeed systems is the reduction in cooling capacity due to the reduction in liquid refrigerant flow through the evaporator to achieve the superheat at the evaporator outlet.

The present invention is an improvement on current technology DX evaporators such that heat absorbing capacity is increased by increasing localized refrigerant flow. The liquid refrigerant flow is increased through local recirculation of liquid from evaporator outlet to evaporator inlet through a vapor ejector which pumps liquid refrigerant from a lower pressure to a higher pressure. This ejector is powered by the flash gas generated in the expansion device before the evaporator inlet.

The invention features a vapor ejector and separator combination that utilizes the flash gas generated from throttling to recycle additional refrigerant liquid from the evaporator outlet to the evaporator inlet. The flash gas generated in DX systems can vary from 5 to 15% or more of the total mass flow rate entering the evaporator. The flash gas is considered mostly a parasitic loss since it does not play a role in the evaporation process (the liquid refrigerant is the key player). This invention enables employing the above flash gas to increase the capacity of the evaporator by recirculating additional liquid through the evaporator. The increased liquid improves heat transfer through higher internal surface contact with boiling liquid. The technique is a regenerative method which utilizes flash gas to boost capacity.

The invention includes a vapor-liquid separator and a vapor ejector. After the throttling process, as in a standard refrigeration cycle, the mixture of liquid and vapor enters the inlet vapor-liquid separator. The vapor-liquid separator generates vapor to power the ejector through flashing of warm refrigerant liquid from a higher temperature and pressure to a lower pressure. The cooler refrigerant liquid then goes to the evaporator inlet as in a normal DX system. The refrigerant vapor as the motive flow travels through the vapor ejector. The vapor ejector pulls cold refrigerant liquid from the outlet of the evaporator into the side port of the ejector. The cold refrigerant liquid and motive vapor flow are separated at the ejector outlet. The liquid is returned to the evaporator inlet circuits for evaporation. The motive vapor flow is returned to the evaporator outlet connection. An expansion valve responsive to refrigerant vapor superheat, after the point where cold refrigerant liquid is collected, would typically be used to adjust inlet liquid flows to the evaporator.

Figure 1:
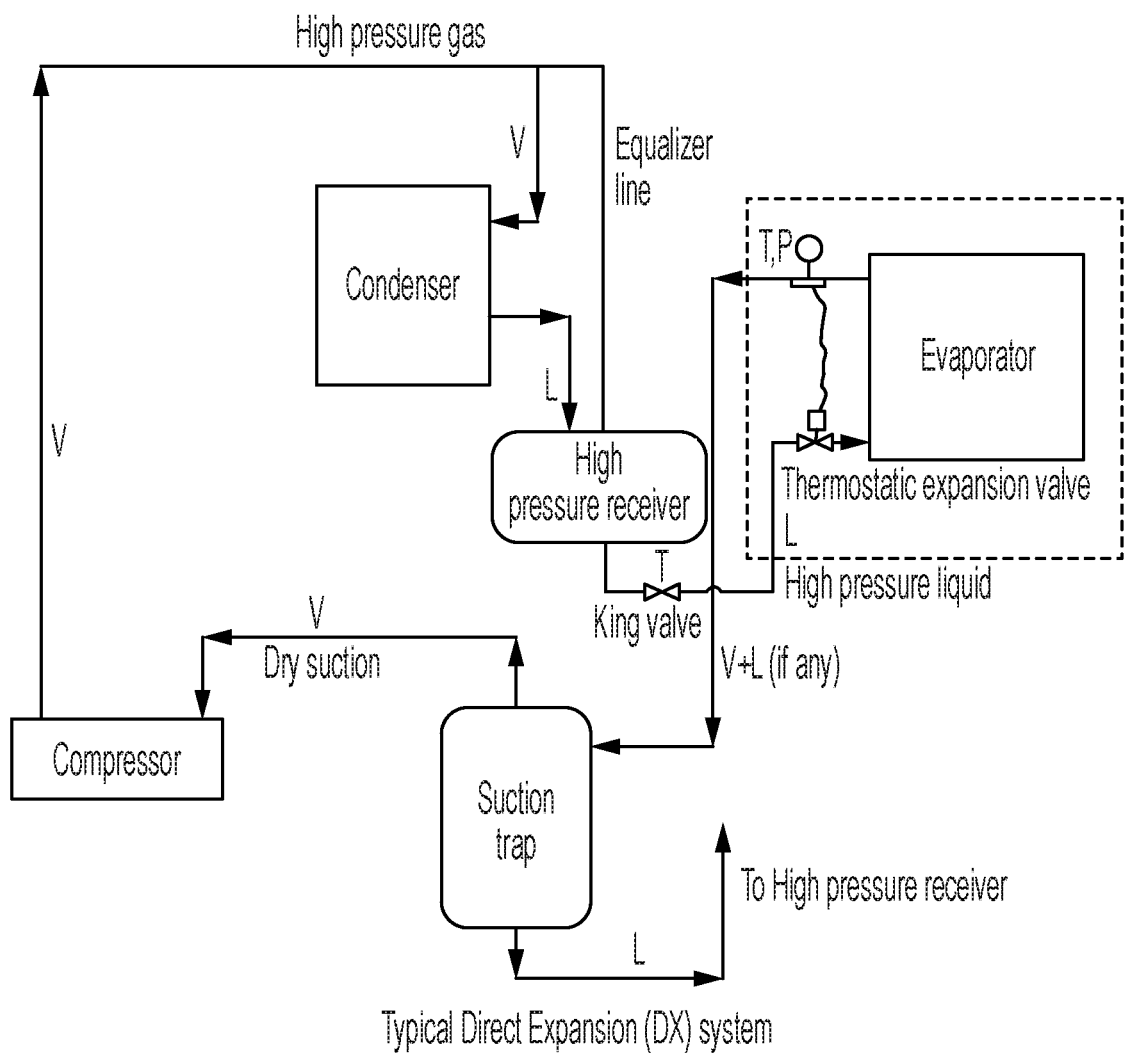
FIG. 1 is a representation of a standard direct expansion refrigeration system.

Features in the attached drawings are numbered with the following reference numerals:

| | |
|---|---|
| 3 | expansion device. |
| 5 | expansion device outlet |
| 7 | refrigerant line |
| 9 | inlet to evaporator inlet separator |
| 11 | inlet vapor-liquid separator |
| 13 | inlet separator vapor outlet |
| 15 | inlet separator liquid outlet |
| 16 | refrigerant line |
| 17 | distributor inlet |
| 18 | refrigerant line |
| 19 | distributor |
| 20 | distributor side port |
| 21 | distributor outlet |
| 23 | evaporator inlets |
| 25 | evaporator |
| 26 | refrigerant line |
| 27 | evaporator outlet |
| 29 | refrigerant line |
| 30 | refrigerant line |
| 31 | ejector vapor inlet |
| 33 | ejector |
| 35 | ejector liquid inlet |
| 37 | ejector outlet |
| 39 | refrigerant line |
| 41 | outlet separator inlet |
| 43 | outlet vapor-liquid separator |
| 45 | outlet separator liquid outlet |
| 46 | refrigerant line |
| 47 | outlet separator vapor outlet |
| 49 | refrigerant line |
| 50 | liquid header inlet |
| 51 | liquid header |
| 53 | liquid header first outlet |
| 55 | liquid header second outlet |
| 57 | refrigerant line |
| 59 | outlet separator second inlet |
| 100 | superheat sensor |
| 102 | controller |

DETAILED DESCRIPTION

FIG. 1 shows a typical or standard direct expansion (DX) refrigeration system. High pressure, high temperature liquid from high pressure receiver enters the evaporator through a thermostatic expansion valve and a distributor. The thermostatic expansion valve regulates (opens or closes) based on the superheat of the outlet vapor with the goal of generating superheated vapor (superheat ≥6° F.) to ensure dry suction for the compressor. However, this is not the case in practice, as unevaporated liquid tends to escape the evaporator resulting in reduction in superheat and closing of the thermostatic expansion valve to reduce the refrigerant flow rate. This reduces refrigeration capacity. Furthermore, there is also a need for a suction trap as shown in FIG. 1 to trap any liquid and ensure dry suction to the compressor.

A DX system as described above, which uses a distributor to distribute liquid to all circuits of the evaporator is also sensitive to mal-distributions. Non-uniform distribution results in excess liquid flowing out of some circuit outlets, which will reduce superheat below target. This causes the thermostatic expansion valve to increase superheat back to target at the cost of reduced capacity.

Figure 2:
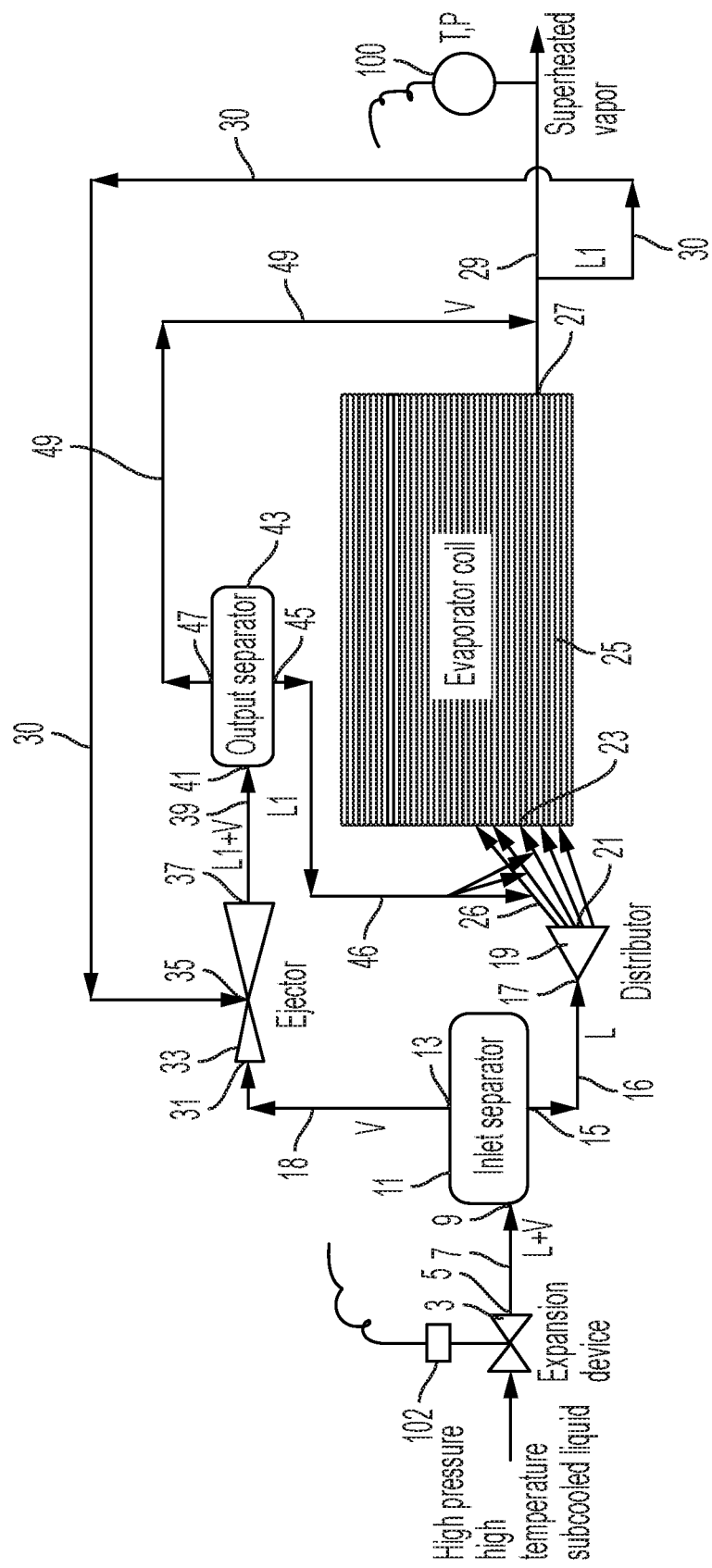
FIG. 2 is a representation of a direct expansion evaporator with vapor ejector capacity boost according to an embodiment of the invention.

FIG. 2 shows the portion of a DX refrigeration system of the invention which replaces the portion of a prior art DX refrigeration system that is enclosed in dashed lines in FIG. 1. Referring to FIG. 2, high pressure, high temperature subcooled liquid is delivered to expansion device 3. The outlet 5 of the expansion device 3 is connected via refrigerant line 7 to the inlet 9 of a vapor-liquid separator 11 (also referred to herein as inlet separator), which sends vapor flash gas received from the expansion device to inlet 31 of an ejector 33, while liquid refrigerant is sent to the inlet 17 of distributor 19 via refrigerant line 16. Distributor outlets 21 are connected to the evaporator coil 25 via refrigerant line 26 for delivery of refrigerant liquid to the evaporator coil 25. While an evaporator coil is used as an example herein, any type of evaporator may be used in connection with the invention. Outlet 27 of the evaporator coil 25 produces both superheated vapor and unevaporated liquid. The superheated vapor is sent to the suction trap and/or compressor via refrigerant line 29, and the unevaporated liquid is sent to the liquid inlet 35 of the ejector 33 via refrigerant line 30. Sensor 100 measures the temperature and pressure of the superheated vapor and sends it to controller 102 to determine whether superheat has been achieved. Controller 102 causes the expansion device to open or close depending on the superheat determination.

Meanwhile, ejector 33 uses the flash gas received from the outlet 13 of inlet separator 11 to heat the unevaporated liquid, and the outlet 37 of the ejector 33 delivers the cooled refrigerant liquid and excess flash gas to the inlet 41 of a vapor-liquid separator 43 (also referred to herein as outlet separator) via refrigerant line 39. The outlet separator 43 separates the vapor from the liquid and sends the liquid back to the evaporator coil 25 via a liquid outlet 45 and corresponding refrigerant line 46. Vapor leaves outlet 47 and joins the vapor leaving the outlet 27 of the evaporator coil 25 via refrigerant line 49. According to this arrangement, the DX system of the invention may provide excess liquid to the evaporator coil in order to maximize refrigeration capacity, but excess liquid leaving the evaporator coil is captured, redirected and reheated before being re-delivered to the evaporator coil, thereby preventing damage to the compressor.

Figure 3:
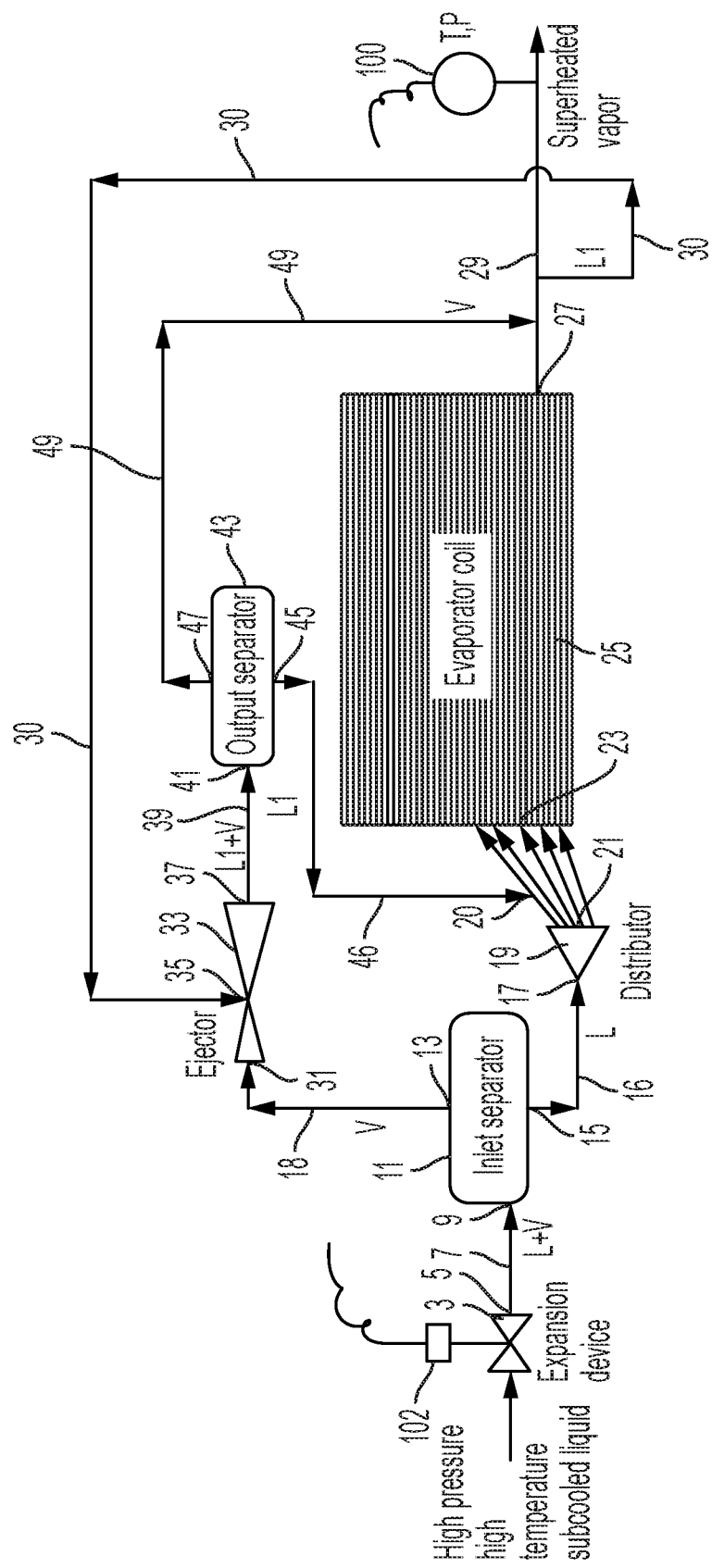
FIG. 3 is a representation of a direct expansion evaporator with vapor ejector capacity boost according to another embodiment of the invention.

FIG. 3 shows a variation of the embodiment shown in FIG. 2, in which the liquid outlet 45 from the outlet separator 43 connected to a side port 20 of the distributor 19 via refrigerant line 46.

Figure 4:
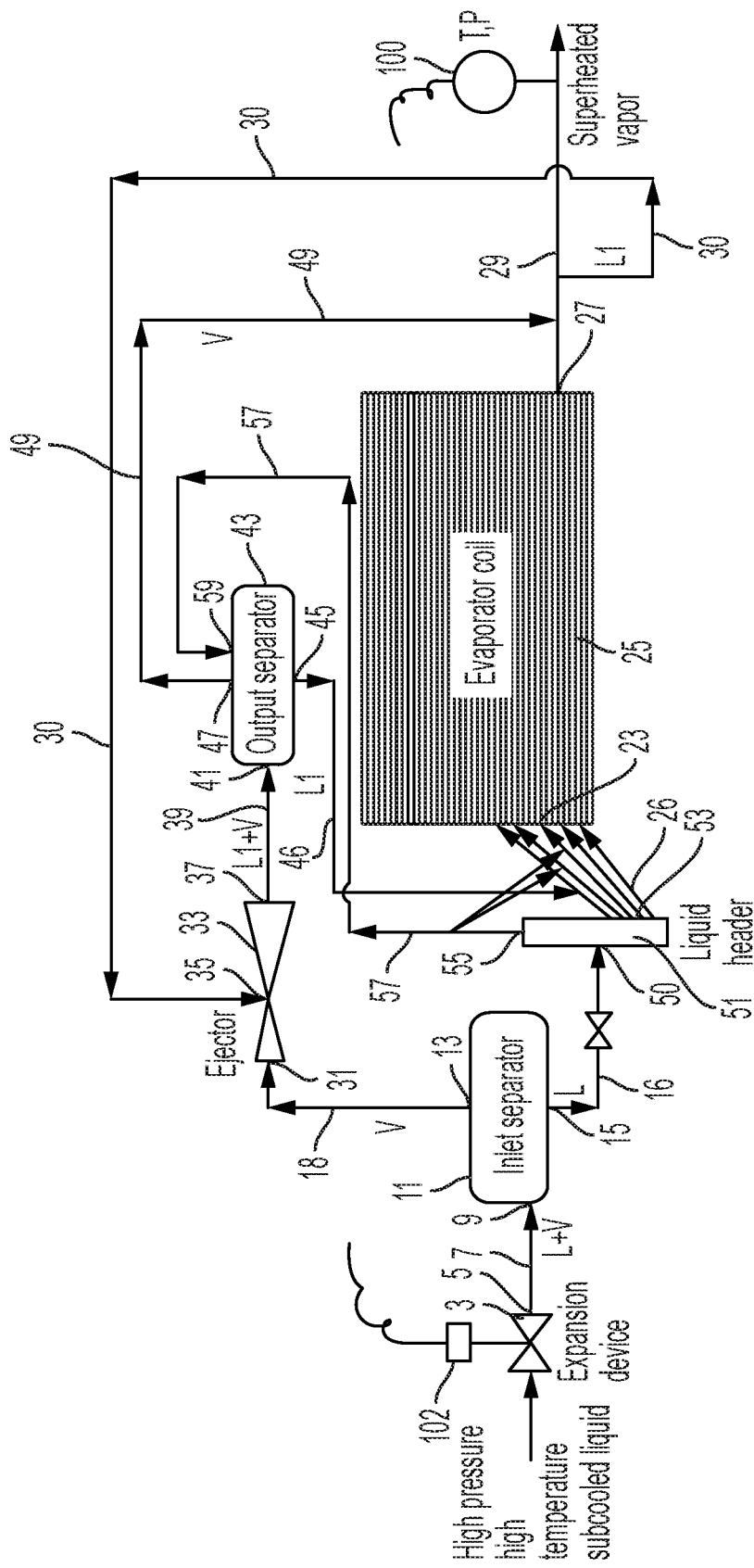
FIG. 4 is a representation of a direct expansion evaporator with vapor ejector capacity boost according to another embodiment of the invention.

FIG. 4 shows an alternate embodiment in which the distributor 19 of the embodiment shown in FIG. 2 is replaced with a liquid header 51. According to this embodiment, inlet separator 11 sends liquid refrigerant to the inlet 50 of liquid header 51 via refrigerant line 16. Liquid header has first outlets 53 and a second outlet 55. First outlets 53 are connected directly or indirectly to the evaporator coil 25, and second outlet 55 is connected to a second inlet 59 of the outlet separator 43 via refrigerant line 57 for providing additional excess liquid to the outlet separator 43. As with the embodiment of FIG. 2, the outlet 45 of outlet separator 43 is connected to the inlet 23 of evaporator coil 25 via refrigerant line 46.

Figure 5:
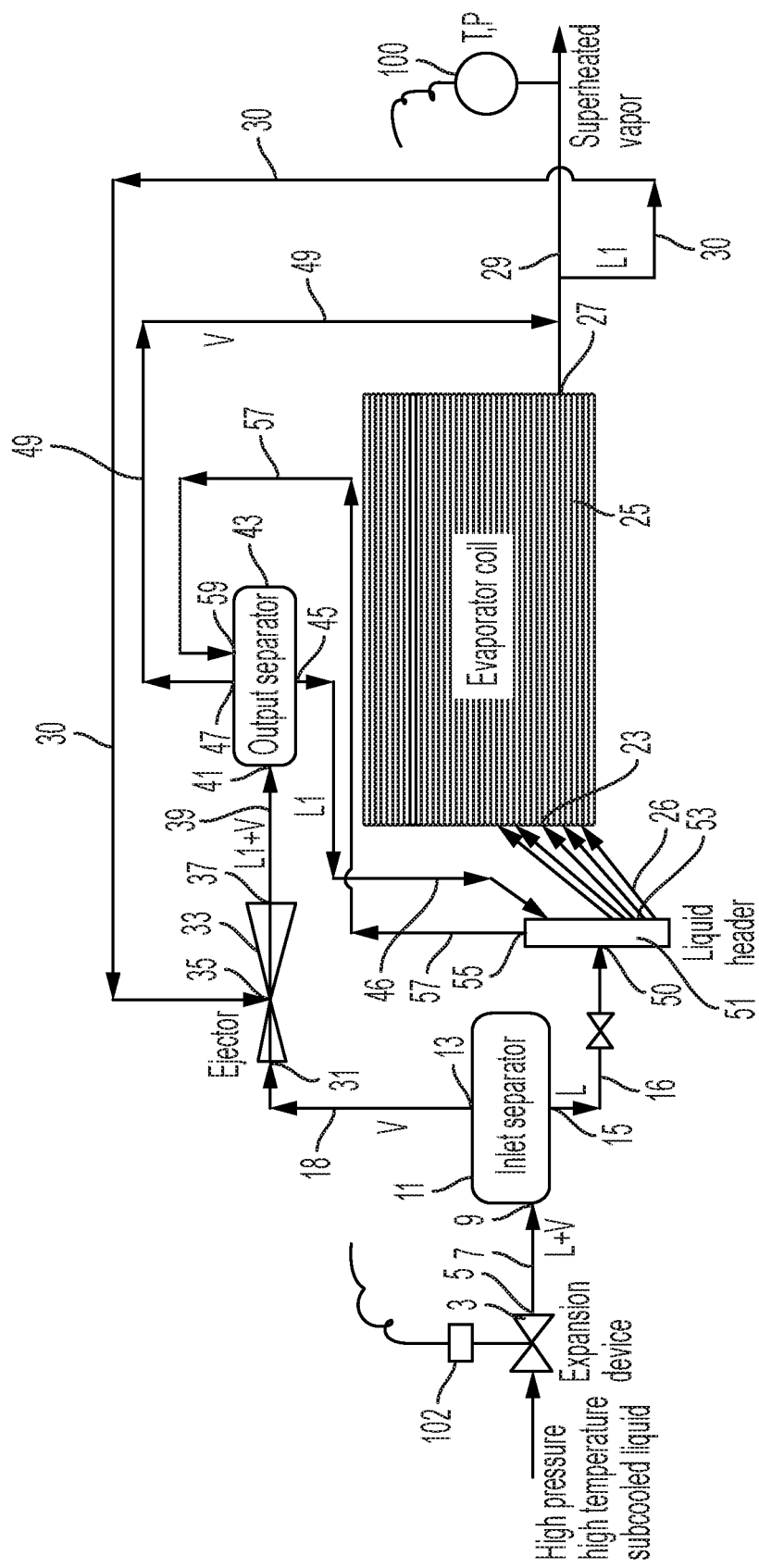
FIG. 5 is a representation of a direct expansion evaporator with vapor ejector capacity boost according to another embodiment of the invention.

FIG. 5 shows a variation of the embodiment shown in FIG. 4 in which outlet 45 of outlet separator 43 is connected directly to the liquid header 51 via refrigerant line 46.

While the inlet vapor-liquid separator, the ejector, and the outlet vapor-liquid separator are shown in the exemplary figures and description as constituting separate structure elements, they may be optionally combined into an integrated refrigerant recycling device which carries out the functions of all three devices.

The invention claimed is:

1. An apparatus for improving the performance of a direct expansion refrigeration system, the apparatus comprising:
an evaporator inlet separator adapted to be connected to an expansion device outlet of said direct expansion refrigeration system,
an evaporator connected to a liquid outlet of said inlet separator,
an ejector connected to a vapor outlet of said evaporator inlet separator,
a first refrigeration line connecting an outlet of said evaporator to a liquid inlet of said ejector,
a second refrigeration line connecting said outlet of said evaporator to a compressor,
an evaporator outlet separator connected to an outlet of said ejector,
an outlet separator liquid outlet connected to said evaporator,
an outlet separator vapor outlet connected to said compressor via a suction trap,
evaporator inlet separator configured to simultaneously and continuously deliver refrigerant vapor to said ejector and refrigerant liquid to said evaporator,
said outlet separator configured to simultaneously and continuously deliver refrigerant liquid to said evaporator and refrigerant vapor to join refrigerant vapor leaving said evaporator.

2. A direct expansion refrigeration system according to claim 1, wherein said inlet separator, said ejector and said outlet separator are combined in an integrated refrigerant recycling device.

3. A direct expansion refrigeration system comprising:
a refrigerant line connecting the following, in order:
a condenser,
an expansion device,
an evaporator inlet separator,
an evaporator, and
a compressor,
said refrigeration system further comprising
an ejector connected to an outlet of said inlet separator and to an outlet of said evaporator, and
an outlet separator connected to an outlet of said ejector and having a first outlet connected to said compressor and a second outlet connected to said evaporator,
said evaporator inlet separator configured to simultaneously and continuously deliver refrigerant vapor to said ejector and refrigerant liquid to said evaporator,
said outlet separator configured to continuously deliver refrigerant liquid to said evaporator and refrigerant vapor to join refrigerant vapor leaving said evaporator.

4. A direct expansion refrigeration system according to claim 3, wherein said inlet separator, said ejector and said outlet separator are combined in an integrated refrigerant recycling device.

5. A method for increasing the refrigeration capacity of a direct expansion refrigeration system without risking liquid refrigerant damage to a compressor comprising the following steps, simultaneously:
taking liquid from an outlet of an evaporator and delivering it to an ejector, taking refrigerant vapor from an evaporator inlet separator located upstream of an evaporator and delivering it to said ejector, using said ejector to warm said refrigerant liquid received from said evaporator with said vapor received from said evaporator inlet separator, delivering a resultant liquid and vapor mixture to an outlet separator, taking all liquid from said outlet separator and delivering it to said evaporator, and taking vapor from said outlet separator and delivering it to said compressor.

6. A method according to claim 5, further comprising taking refrigerant liquid from said evaporator inlet separator and delivering it directly to a distributor for said evaporator.

7. A method according to claim 5, further comprising taking refrigerant liquid from said evaporator inlet separator and delivering it to an evaporator liquid header via an expansion valve.

* * * * *